United States Patent [19]

Brugel

[11] Patent Number: 5,242,987
[45] Date of Patent: Sep. 7, 1993

[54] PROCESS FOR CHLORINATION AND CHLOROSULFONATION OF OLEFIN POLYMERS IN SUSPENSIONS OF PERFLUORINATED LIQUIDS

[75] Inventor: Edward G. Brugel, Wilmington, Del.

[73] Assignee: E. I. Du Pont de Nemours and Company, Wilmington, Del.

[21] Appl. No.: 10,966

[22] Filed: Jan. 29, 1993

[51] Int. Cl.$^5$ .............................................. C08F 8/22
[52] U.S. Cl. ................................ 525/354; 525/333.9; 525/334.1; 525/356
[58] Field of Search .............................. 525/354, 356

[56] References Cited

U.S. PATENT DOCUMENTS

| 2,537,641 | 1/1951 | Bartovics | 525/356 |
| 3,542,747 | 11/1970 | Ennis et al. | 525/356 |
| 4,602,068 | 7/1986 | Bronstert . | |

FOREIGN PATENT DOCUMENTS

| 834905 | 5/1960 | United Kingdom . |
| 1325579 | 8/1973 | United Kingdom . |

OTHER PUBLICATIONS

Defensive Publication T917,004, Young et al. "Process for the Chlorination of Polyolefins", Published Dec. 4, 1973.

Primary Examiner—Bernard Lipman
Attorney, Agent, or Firm—Marilyn H. Bromels

[57] ABSTRACT

Olefin polymers of melt index 1-500 g/10 minutes are chlorinated or chlorosulfonated in perfluorinated alkane, perfluorinated ether, or perfluorinated tertiary amine suspension.

15 Claims, No Drawings

PROCESS FOR CHLORINATION AND CHLOROSULFONATION OF OLEFIN POLYMERS IN SUSPENSIONS OF PERFLUORINATED LIQUIDS

BACKGROUND

This invention relates to chlorination or chlorosulfonation of olefin polymers. In particular, this invention relates to a process for preparation of chlorinated or chlorosulfonated olefin polymers in suspension in perfluorinated alkane, perfluorinated ether, or perfluorinated trialkyl amine media.

Chlorinated and chlorosulfonated olefin homopolymers and copolymers are well-known compositions useful as elastomers, coatings, adhesives, and inks. The chlorinated polymers are prepared on a commercial scale by reaction of chlorine with olefin polymers in either solution or aqueous suspension, while the chlorosulfonated analogues are prepared by reaction of olefin polymers with chlorine and sulfuryl chloride or sulfur dioxide in solution. Reactive extrusion and solventless processes have also been disclosed, for example in U.S. Pat. No. 3,347,835 and in U.S. Pat. No. 4,554,326. In addition, chlorination and chlorosulfonation of solvent-swollen ethylene polymers in fluids consisting of fluorocarbons having 1-4 carbon atoms has been disclosed in British Patent 1,325,579.

Each of these prior art processes has disadvantages. Specifically, solution processes require large volumes of organic solvents, generally chlorinated solvents such as carbon tetrachloride, which must be recovered and recycled. For example, hydrofluorocarbon solvents undergo appreciable chlorination resulting in the production of undesirable chlorofluorocarbons. In addition, due to the environmental hazards associated with these halogenated materials, stringent control of emissions and substantial investments in pollution control equipment are necessary. Aqueous suspension processes, on the other hand, cannot be used for preparation of chlorosulfonated olefin polymers. Further, it is necessary to employ surface active agents during aqueous suspension chlorination processes to prevent agglomeration. The presence of such agents can have deleterious effects on the physical properties of the polymeric products. Reactive extrusion processes are not attractive because they are either limited to production of compositions containing low levels of chlorine, e.g. as disclosed in U.S. Pat. No. 4,554,326, or they are not adaptable for use on a commercial scale without major modification, see for example U.S. Pat. No. 3,347,835. Solventless processes are also not adapted to commercial scale exploitation. Finally, the process disclosed in British Patent 1,325,579, wherein fluorocarbon-swollen ethylene polymers are chlorinated or chlorosulfonated is unsuitable for preparation of a significant number of chlorinated ethylene copolymer resin types, in particular copolymers of vinyl acetate and methacrylic acid, because the surface tack of these polymers causes severe agglomeration during chlorination. In addition, these materials dissolve a portion of the chlorinated resin products resulting in sticky particle surfaces and additional isolation steps.

Thus there remains a need in the art for a process which allows production of a broad spectrum of chlorinated and chlorosulfonated olefin polymers, is economical on a commercial scale, yet does not require the use of large quantities of chlorinated solvents.

SUMMARY OF THE INVENTION

The present invention is directed to a process for chlorination and chlorosulfonation of a broad range of alpha-olefin polymers in suspension in the presence of fluorinated organic compounds.

In particular the present invention is directed to a process for the preparation of chlorinated olefin polymers which comprises a) suspending an olefin polymer selected from the group consisting of homopolymers and copolymers of $C_2$-$C_8$ alpha-monoolefins having melt indexes of 1-500 g/10 minutes, as determined according to ASTM D1238, in a liquid medium substantially inert to chlorination which has a boiling point of 25°-250° C. and in which the olefin polymer and the chlorinated olefin polymer are substantially insoluble, said liquid medium being selected from the group consisting of i) perfluorinated $C_6$-$C_{20}$ aliphatic and cycloaliphatic alkanes, ii) perfluorinated $C_3$-$C_{15}$ aliphatic and cycloaliphatic ethers, and iii) aliphatic and cycloaliphatic perfluorinated tertiary alkyl amines of the formula

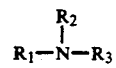

wherein $R_1$, $R_2$, and $R_3$ are independently perfluorinated alkyl groups having 3-12 carbon atoms, and $R_1$ and $R_2$ may be joined to form a cycloaliphatic ring wherein 0-3 methylene groups of the cycloaliphatic ring are replaced by moieties selected from the group consisting of oxo, sulfo, and perfluoroalkylamino, b) introducing a chlorinating agent to the suspension in the presence of a free radical catalyst, and c) chlorinating the olefin polymer to produce a chlorinated olefin polymer having a chlorine content of about 20-70 percent by weight.

In a preferred embodiment of the process of the present invention the chlorinating agent is a chlorosulfonating agent, for example a mixture of elemental chlorine and sulfur dioxide or sulfuryl chloride, which results in the introduction of chlorosulfonyl moieties concomitantly with chlorination of the olefin resin.

DETAILED DESCRIPTION OF THE INVENTION

A wide variety of olefin polymers may be chlorinated or chlorosulfonated according to the process of the present invention. By olefin polymers is meant homopolymers and copolymers of $C_2$-$C_8$ alpha-monoolefins, including graft copolymers. Particularly useful examples include homopolymers of $C_2$-$C_3$ alpha monoolefins, copolymers of ethylene and carbon monoxide, and copolymers of ethylene and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono-or dicarboxylic acids, anhydrides of unsaturated $C_4$-$C_8$ dicarboxylic acids, and vinyl esters of saturated $C_2$-$C_{18}$ carboxylic acids. Specific examples of such polymers include polyethylene, polypropylene, ethylene vinyl acetate copolymers, ethylene acrylic acid copolymers, ethylene methacrylic acid copolymers, ethylene methyl acrylate copolymers, ethylene methyl methacrylate copolymers, ethylene n-butyl methacrylate copolymers, ethylene glycidyl methacrylate copolymers, graft copolymers of ethylene and maleic anhydride, graft copolymers of propylene and maleic anhydride, and copolymers of ethylene with propylene, butene, 3-methyl-1-pentene, or octene. The copolymers may be dipolymers, terpolymers, or higher order copolymers. Preferred olefin polymers are polyethylene, copolymers of ethylene and vinyl acetate, copolymers of ethylene and acrylic acid, and copolymers of ethylene and methacrylic acid. Melt indexes of the olefin polymers generally range from 1-500 g/10 minutes, as determined according to ASTM D1238. If the melt index is less than about 1 g/10 minutes the resulting chlorinated polymer is of high viscosity and is unsuitable for use in the formulation of solution coatings and latexes. In addition, the use of such compositions is impractical in applications which require extrusion. If the melt index of the olefin polymer is higher than 500 g/10 minutes the chlorinated polyolefin product tends to agglomerate during the chlorination process. Melt indexes of 2-150 g/10 minutes are preferred.

An important feature of the present invention resides in the selection of the suspension medium in which the chlorination or chlorosulfonation is performed. The fluid should be substantially inert to chlorination and have a boiling point between about 25° C. and about 250° C. A boiling point less than about 25° C. is undesirable because it leads to development of high pressure in the reactor in those cases wherein it is necessary to increase the reaction temperature to achieve high chlorination levels. Fluids having boiling points above 250° C. have the disadvantage of high solution viscosities which can lead to poor polymer dispersion. In addition high boiling solvents are more difficult to separate from the polymer product. Preferably, the reaction medium should also be nonflammable and non-toxic. In addition, most desirably, the fluid selected will not dissolve or swell the product or the polymeric starting material to any substantial extent. Dissolution would necessitate treatment of the reaction medium to recover the dissolved product, whereas if the product is substantially insoluble simpler methods of product recovery, such as filtration or decantation, are adequate. Furthermore, recovery of dissolved product on a commercial scale requires costly processing of large quantities of solvent and expensive pollution control systems. It is preferable that the reaction medium not swell the olefin polymer starting material or chlorinated product because such swelling creates sticky polymer particle surfaces which promotes polymer agglomeration during the chlorination or chlorosulfonation reaction. This results in gross non-homogeneity with respect to chlorine content of the product.

The particular perfluorinated compounds which meet these criteria and are suitable for use as reaction media in the process of the present invention belong to three generic classes. The first of these includes linear or branched aliphatic or cycloaliphatic perfluorinated alkanes containing 6-20 carbon atoms. Specific examples of such compounds include perfluorohexane, perfluoroheptane, perfluorooctane, perfluoroisooctane, perfluorodecane, and perfluorododecane. The alkanes must contain at least six carbon atoms to eliminate solvent swelling of the olefin polymers. Lower alkanes swell the olefin polymer particle surfaces which results in development of excessive surface tack and resultant particle agglomeration. Chlorination then primarily takes place only on the surfaces leading to a non-homogeneous product.

The second class of perfluorinated compounds includes aliphatic or cycloaliphatic perfluorinated ethers which contain 3-15 carbon atoms. Specific examples include perfluorinated dibutyl ether, perfluorinated 2-butyltetrahydrofuran, and perfluorohexylisobutyl ether.

Included in the third class of perfluorinated compounds are perfluorinated aliphatic or cycloaliphatic tertiary alkyl amines having alkyl groups of 3-12 carbon atoms. The amino group may be bonded to three linear or branched alkyl groups. In addition two of the alkyl groups may be joined to form a cycloaliphatic ring. Optionally, 1-3 of the methylene groups of the cycloaliphatic ring may be replaced by oxo, sulfo, or perfluoroalkylamino groups. Specific examples of the perfluorinated amines include perfluorotri-n-propylamine, perfluorotriisopropylamine, perfluorotri-n-butylamine, perfluorotriamylamine, perfluorodibutylpropylamine, perfluoro-N-methylmorpholine, perfluoro-N-ethylmorpholine, and perfluoro-N-methylpyrrolidine.

According to the process of the present invention chlorine or a chlorine-generating agent is introduced to an agitated suspension of an olefin polymer in one of the above-described perfluorinated alkanes, perfluorinated ethers, or perfluorinated alkyl amines in the presence of a free radical generating agent. The additional presence of sulfur dioxide or a chlorosulfonating agent, such as a mixture of sulfur dioxide and sulfuryl chloride, or sulfuryl chloride alone, will result in incorporation of sulfonyl chloride moieties along the polymer backbone. Chlorination or chlorosulfonation then proceeds until the desired level of chlorine and sulfur has been incorporated. Products containing any desired level of chlorine, up to the theoretical maximum, may be produced using the process of the present invention. However, chlorinated polymers having 20-70 wt. % combined chlorine are of the greatest commercial interest for applications as elastomers, coatings, adhesives, and inks. Chlorine contents above 20 wt. % are desirable in order to assure that the product is non-crystalline. Compositions having chlorine contents of 20-40 wt. % are particularly useful as elastomers and adhesive compositions, while those having chlorine contents of 50-70 wt. % are most useful in the formulation of coatings and inks. If the olefin polymer is chlorosulfonated sulfur may be introduced up to a level of about 6 wt. %, but preferably 1-3 wt. % sulfur is usually introduced because it assures the highest degree of thermal stability.

The chlorination or chlorosulfonation reaction may be performed continuously or in a batch-wise manner at temperatures of about 50°-220° C., preferably 100°-120° C., at atmospheric pressure or at elevated pressures of 0.01-0.50 MPa. Conventional free radical initiators, such as organic peroxides or azo compounds, are generally used, for example ditertiarybutyl peroxide, 2,2'-azobis[2-methylpropanenitrile] or other compounds of comparable free radical activity. The presence of light, especially ultraviolet light, can also act as a free radical initiator.

After the desired degree of chlorination or chlorosulfonation has occurred the reaction is terminated by stopping the flow of chlorinating or chlorosulfonating agent. A stabilizer, generally an epoxidized phenol such as the condensation product of two moles of epichlorohydrin with one mole of propane-2,2-bisphenol, is added and the product is isolated, for example, by filtration, or extrusion. When isolation is accomplished by filtration, the polymer product can be freed from residual perfluorinated liquid by washing with a solvent in which the perfluorinated liquid is soluble, but in which the polymer is substantially insoluble. When the isolation method is extrusion, the reaction mixture may be preconcentrated by filtration, decantation, devolatization, or evaporation prior to introduction into the feed section of a devolatilizing extruder.

The following examples, wherein all percentages are by weight unless otherwise stated, illustrate several preferred embodiments of the present invention.

EXAMPLES

Example 1

A 400 ml resin kettle was charged with 100 ml Fluorinert ®FC-77 perfluorinated liquid (a mixture of perfluorinated $C_8$ alkanes having a boiling point of 97° C. and a density of 1.65 g/cc), 5 g polyethylene (density 0.95 g/cc, melt index 2 g/10 minutes), and 0.030 g azobisisobutyronitrile initiator. The reaction mixture was heated to 60° C. and chlorine gas was introduced at a rate of 0.8 g/minute. During this time period additional initiator was added at a rate of 0.001 g/minute. The temperature was maintained at 60° C. for two hours and then raised to 70° C. After 60 minutes at 70° C. the addition of chlorine and initiator was stopped and the reaction mixture was cooled to room temperature. The product, which was isolated by filtration, washed twice with methanol and dried under vacuum at 50° C., had a chlorine content of 33.31%.

Example 2

A 400 ml fluted resin kettle was charged with 100 ml Fluorinert ®FC-77 perfluorinated liquid (a mixture of perfluorinated $C_8$ alkanes having a boiling point 97° C. and a density of 1.65 g/cc), 5 g powdered polyethylene (density 0.95 g/cc, melt index 2 g/10 minutes), 3 ml sulfuryl chloride and 0.030 g azobisisobutyronitrile initiator. The reaction mixture was heated to 60° C. and chlorine gas was introduced at a rate of 0.46 g/minute. Additional initiator was added at a rate of 0.001 g/minute. The temperature was gradually increased at a rate of 1° C./minute over a 3 hour time period to a final temperature of 90° C. After 4 hours addition of chlorine was stopped and the reaction mixture was cooled to room temperature. The product was isolated by filtration, washed twice with methanol, and dried under vacuum at 50° C. The chlorosulfonated polymer contained 30.8% chlorine and 0.62% sulfur.

Comparative Example 1

A 400 ml resin kettle was charged with 100 ml Fluorinert ®FC-77 perfluorinated liquid (a mixture of perfluorinated $C_8$ alkanes having a boiling point 97° C. and a density of 1.65 g/cc), 10 g ethylene vinyl acetate copolymer (14 wt. % vinyl acetate, melt index 2500 g/10 minutes), and 0.030 g azobisisobutyronitrile initiator. The reaction mixture was heated to 60° C. and chlorine gas was introduced at a rate of 0.46 g/minute. The temperature was maintained at 60° C. for two hours and then raised to 70° C. After approximately 20 minutes at 70° C. the polymer particles agglomerated and the reaction mixture was cooled to room temperature. The product was washed twice with methanol using a Waring blender and isolated by filtration. The product was dried under vacuum at 50° C. The product contained 16.63% chlorine and had a $T_g$ of −15.58° C. The low chlorine content indicates that only the outer surface of the polymer powder had been chlorinated prior to agglomeration. This example illustrates that polymers of high melt index are not suitable for use in the process of the invention.

Comparative Example 2

A 400 ml resin kettle was charged with 100 ml Fluorinert ®FC-77 perfluorinated liquid (a mixture of perfluorinated $C_8$ alkanes having a boiling point 97° C. and a density of 1.65 g/cc), 10 g powdered polyethylene (density 0.92 g/cc, MW 2500, Brookfield viscosity 300 poise @ 140° C.), and 0.030 g azobisisobutyronitrile initiator. The reaction mixture was heated to 60° C. and chlorine gas was introduced at a rate of 0.46 g/minute. Additional initiator was added at a rate of 0.001 g/minute. The temperature was gradually increased at a rate of 1° C./minute. After 15 minutes the polymer had completely agglomerated. The chlorine gas flow was discontinued and the reaction mixture was cooled to room temperature. The polymer was combined with methanol, ground in a Waring Blender, and isolated by filtration. After being washed twice with methanol the polymer was dried under vacuum at 50° C. The product contained only 6.96% chlorine. This example illustrates that polymers of high melt index are not suitable for use in the process of the invention.

I claim:

1. A process for the preparation of chlorinated olefin polymers which comprises
    a) suspending an olefin polymer selected from the group consisting of homopolymers and copolymers of $C_2$-$C_8$ alpha-monoolefins having melt indexes of 1-500 g/10 minutes, as determined according to ASTM D1238, in a liquid medium substantially inert to chlorination which has a boiling point of 25°-250° C. and in which the olefin polymer and the chlorinated olefin polymer are substantially insoluble, said liquid medium being selected from the group consisting of i) perfluorinated $C_6$-$C_{20}$ aliphatic and cycloaliphatic alkanes, ii) perfluorinated $C_3$-$C_{15}$ aliphatic and cycloaliphatic ethers, and iii) aliphatic and cycloaliphatic perfluorinated tertiary alkyl amines of the formula

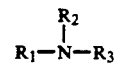

wherein $R_1$, $R_2$, and $R_3$ are independently perfluorinated alkyl groups having 3-12 carbon atoms, and $R_1$ and $R_2$ may be joined to form a cycloaliphatic ring wherein 0-3 methylene groups of the cycloaliphatic ring are replaced by moieties selected from the group consisting of oxo, sulfo, and perfluoroalkylamino,
    b) introducing a chlorinating agent to the suspension in the presence of a free radical catalyst, and
    c) chlorinating said olefin polymer to produce a chlorinated polymer having a chlorine content of about 20-70 percent by weight.

2. The process of claim 1 wherein the liquid medium is a perfluorinated $C_6$-$C_{20}$ aliphatic and cycloaliphatic alkane.

3. The process of claim 1 wherein the liquid medium is a mixture of perfluorinated $C_8$ alkanes.

4. The process of claim 1 wherein the liquid medium is a perfluorinated $C_3$-$C_{15}$ aliphatic or cycloaliphatic ether.

5. The process of claim 1 wherein the liquid medium is an aliphatic or cycloaliphatic perfluorinated tertiary alkyl amine.

6. The process of claim 1 wherein the chlorinating agent is chlorine.

7. The process of claim 1 wherein the chlorinating agent is a chlorosulfonating agent.

8. The process of claim 7 wherein the chlorinating agent is selected from the group consisting of sulfuryl chloride, a mixture of chlorine and sulfur dioxide, and a mixture of chlorine and sulfuryl chloride.

9. The process of claim 1 wherein the olefin polymer is selected from the group consisting of homopolymers of $C_2$-$C_3$ alpha monoolefins, copolymers of ethylene and carbon monoxide, and copolymers of ethylene and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono-or dicarboxylic acids, anhydrides of unsaturated $C_4$-$C_8$ dicarboxylic acids, and vinyl esters of saturated $C_2$-$C_{18}$ carboxylic acids.

10. The process of claim 1 wherein the melt index of the olefin polymer is 2-150 g/10 minutes.

11. The process of claim 1 wherein the olefin polymer is an ethylene vinyl acetate copolymer.

12. The process of claim 1 wherein the olefin polymer is polyethylene.

13. The process of claim 1 wherein the olefin polymer is a copolymer of ethylene and acrylic acid.

14. The process of claim 1 wherein the olefin polymer is a copolymer of ethylene and methacrylic acid.

15. The process of claim 1 wherein the chlorinated resin has a sulfur content of 1-3 percent by weight.

* * * * *